Figure 1:
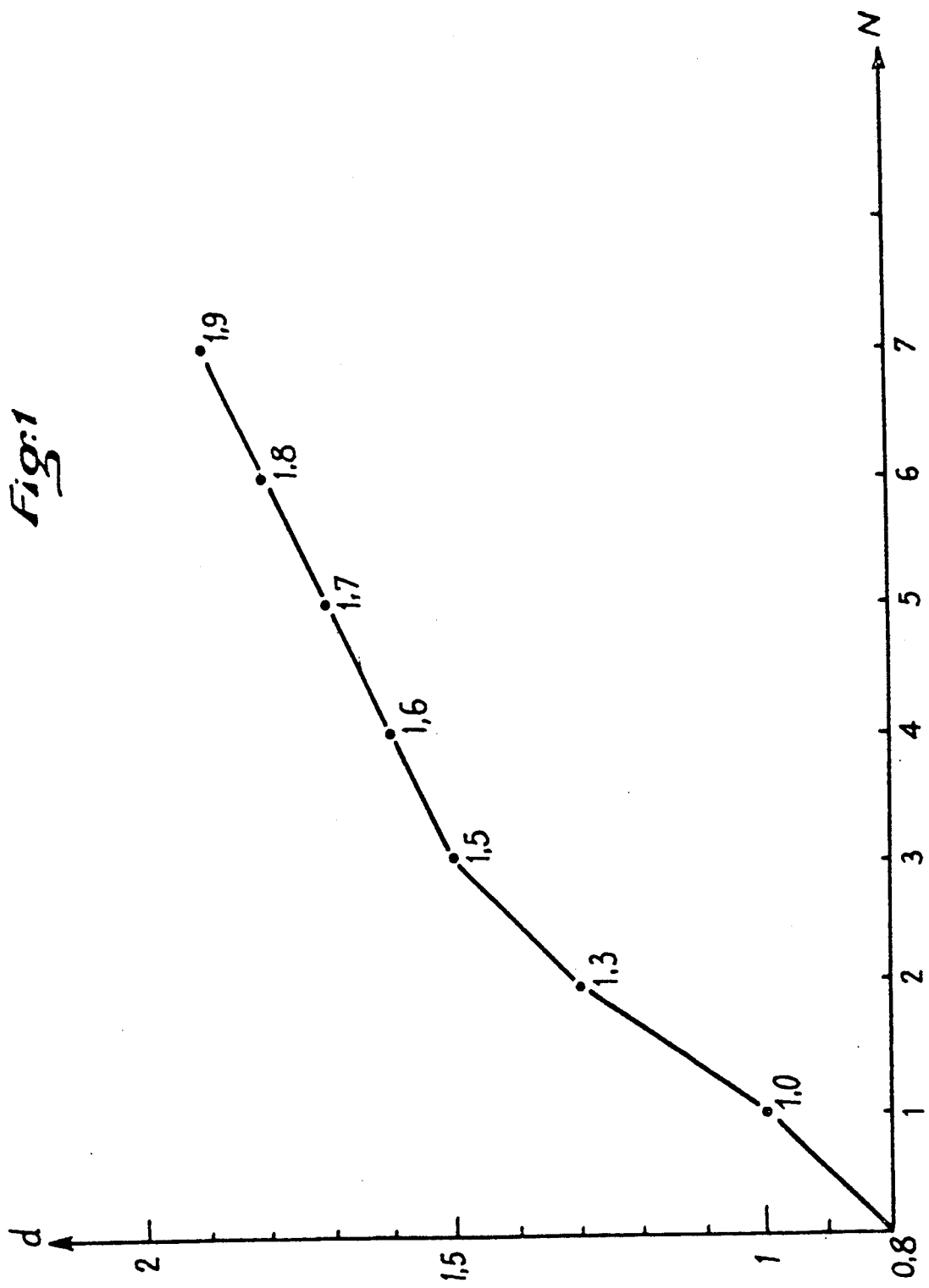

United States Patent [19]

Debaig-Valade et al.

[11] Patent Number: 5,024,979
[45] Date of Patent: Jun. 18, 1991

[54] METHOD OF FORMING A FIBROUS STRUCTURE COMPOSITE CERAMIC MATERIAL AND MATERIAL THUS OBTAINED

[75] Inventors: Caroline Debaig-Valade, Bordeaux; Claude Filliatre, Talence; Christian Servens, St-Aubin de Medoc, all of France

[73] Assignee: Aerospatiale Societe Nationale Industrielle, Paris, France

[21] Appl. No.: 327,037

[22] Filed: Mar. 22, 1989

[30] Foreign Application Priority Data

Apr. 6, 1988 [FR] France ................... 8804546

[51] Int. Cl.$^5$ ............................................. C04B 35/80
[52] U.S. Cl. ........................................ 501/95; 501/92; 501/97; 264/62; 427/226; 427/227; 427/228; 427/397.7
[58] Field of Search ................... 264/62; 427/226, 227, 427/228, 397.7; 501/95, 96, 92, 97

[56] References Cited

U.S. PATENT DOCUMENTS

| | | | |
|---|---|---|---|
| 4,122,139 | 10/1978 | Yajima et al. | 264/63 X |
| 4,395,460 | 7/1983 | Gaul | 501/88 X |
| 4,404,153 | 9/1983 | Gaul, Jr. | 501/88 X |
| 4,618,591 | 10/1986 | Okamura et al. | 501/90 |
| 4,689,252 | 8/1987 | Lebrun et al. | 427/228 |
| 4,828,774 | 5/1989 | Andersson et al. | 501/95 X |
| 4,851,491 | 7/1989 | Riccitiello et al. | 501/96 X |

FOREIGN PATENT DOCUMENTS

| | | | |
|---|---|---|---|
| 0078197 | 5/1983 | European Pat. Off. | 501/95 |
| 0130105 | 1/1985 | European Pat. Off. | 501/95 |
| 0179589 | 7/1985 | | |

OTHER PUBLICATIONS

Annual Review In Materials Science 1984, vol. 14, pp. 297-313.
Encyclopedia of Polymer Science and Engineering, vol. 13, pp. 162-186 and 312-344.
Websters Third New International Dictionary, pp. 350, 1590 and 1785.
Fitzer, E., et al., A, Ceramic Society Bul., vol. 65, No. 2, (Jan. 1986) pp. 326 to 335.

*Primary Examiner*—Karl Group
*Attorney, Agent, or Firm*—Fisher, Christen & Sabol

[57] ABSTRACT

A method is provided for forming a composite ceramic material, in which a fibrous structure is first of all formed which is then embedded in the material of a ceramic matrix. To introduce said matrix into said structure, the following succession of operations is carried out:

(a) said fibrous support is impregnated with a polymerization catalyst for an organometallic precursor of said ceramic matrix;
(b) said fibrous support impregnated with said polymerization catalyst is placed in contact with said organometallic precursor;
(c) said organometallic precursor is polymerized, and
(d) said organometallic precursor is pyrolysed so as to obtain said matrix.

16 Claims, 4 Drawing Sheets

METHOD OF FORMING A FIBROUS STRUCTURE COMPOSITE CERAMIC MATERIAL AND MATERIAL THUS OBTAINED

BACKGROUND OF THE INVENTION

The present invention relates to a method of forming a composite ceramic material with fibrous structure, as well as the ceramic-ceramic material obtained by this method.

Particularly in the manufacture of ceramic thermomechanical parts intended for example for aeronautics, astronautics, the automobile industry or the furnace industry, composite materials are produced having a fibrous structure embedded in a ceramic material. For this, a porous, unidirectional or multidirectional (with two or three dimensions or random fiber distribution) structure is first of all formed using silicon carbide, alumina, silica, carbon or similar material fibers. The porosity of such a porous structure may, by volume, be about 40 to 90 %. then, the porous structure is embedded in a ceramic matrix.

So that the final ceramic material thus obtained has optimum mechanical and physical properties, its density must be as great as possible, i.e. the matrix must fill the pores of the fibrous structure to a maximum. That then means that, for the matrix, a material must be chosen whose viscosity (in solution or molten state) permits good penetration in the fibrous structure. The result is that some materials cannot be used for this reason as matrix. In addition, even when the material of the matrix is chosen from those likely to have adequate viscosity, in order to assist penetration of the porous structure by the more or less fluid material matrix, complex filling cycles need to be used and these cycles increased. This results in high manufacturing costs and delays. Finally, despite all these limitations and complications, the density of the material thus obtained by known methods cannot exceed an upper limit (not optimum for the desired properties of the material) because the surface pores of the structure are stopped up before the internal pores are filled. This results then in surface clogging preventing the complete filling of the porous structure by means of the material of the matrix.

SUMMARY OF THE INVENTION

An object of the present invention is to overcome these drawbacks. It makes it possible to obtain dense ceramic composite materials, at atmospheric pressure and with a limited number of cycles, so that the manufacturing costs and delays are reduced.

For this, in accordance with the present invention, the method for forming a composite ceramic material, in which a fibrous structure is first of all formed which is then embedded in the material of the ceramic matrix, is remarkable in that, in order to introduce said matrix into said structure, the following succession of operations is carried out :
  a) said fibrous support is impregnated with a polymerization catalyst for an organometallic precursor of said ceramic matrix;
  b) said fibrous support impregnated with said polymerization catalyst is placed in contact with said organometallic precursor;
  c) said organometallic precursor is polymerized, and
  d) said organometallic precursor is pyrolysed so as to obtain said matrix.

The Applicant has found that with this procedure, the filling of the porous structure by the matrix could be improved, this remarkable result being due to the fact that the polymerization catalyst may without difficulty be introduced, for example in the form of a solution, into the pores of the matrix which then promotes formation of the organometallic polymer and so of the matrix within the fibrous support itself. Two very important concomitant effects result therefrom. On the one hand, introduction of the material of the matrix into the porous structure and polymerization of this material are practically simultaneous, which considerably simplifies each of the filling cycles for the porous structure. On the other hand, since the material of the matrix may be developed within the porous structure itself, the internal pores thereof are filled at the same time as the surface pores, so that the difficulties due to the surface clogging described above in connection with the prior art are not met with. In addition, with the present invention, the problems of fusibility and solubility in appropriate solvents for the material of the matrix are overcome.

Thus, the method of the present invention makes it possible to improve the quality of the composite material by increasing its density, while using only procedures which are simple to use, essentially because the polymerization reaction leading to the precursor of the matrix and impregnation of the fibrous structure are carried out simultaneously, and within this fibrous structure itself.

This double impregnation and polymerization operation may thus be conducted without having to change reactor and at atmospheric pressure, or else, possibly, in a known way using vacuum and pressure cycles so as to further increase the impregnation efficiency.

As polymerization catalyst, polyborosiloxanes are used, such as polyborodimethylsiloxane, polyborodiethylsiloxane, polyborodiphenylsiloxane or polyborodivinylsiloxane, organic acids such as trifluoromethanesulfonic acid or tribromomethanesulfonic acid and/or trifluoroacetic acid or else transition metals in the form of complexes, such as dodecacarbonyltriruthenium for example.

Depending on the material desired for the matrix (silicon carbide, silicon nitride, sialon, boron nitride, etc..), the polymerizable organometallic precursors of the ceramic material may be chosen from the carbosilanes, the silazanes, the carbosilazanes, the borazines, the borazanes or the aluminosilicates associated with silanes.

The organometallic precursor used may be either a direct precursor of the material desired for the matrix, or an indirect precursor capable of giving rise to this direct precursor by heat treatment. For example, when it is desired to obtain a silicon carbide matrix, either the direct precursor formed by a carbosilane may be used or the indirect precursor formed by polydimethylsilane. In the latter case, the polydimethylsilane is subjected to heat treatment (at a temperature of about 350° C.) and generates the polymerizable carbosilane which will form the direct precursor.

Similarly, when it is desired to obtain a boron nitride or silicon nitride matrix, for example, as indirect precursor B-triphenyl N-trimethylborazine or tetramethyl-1,1,3,3 disilazane may be used respectively.

When such an indirect precursor is used, it is advantageous in operation b) above to place the fibrous support, impregnated with the catalyst, in contact with the indirect precursor and to provide substantially simultaneously the heat treatment for transforming the indirect precursor into a direct precursor, impregnation of the fibrous support with said direct precursor and polymerization of the latter. Thus, these three operations may be carried out in the same reactor.

Generally, the method of the present invention may be used in the following way:

a)
- a1—a solution of the polymerization catalyst in a solvent is formed,
- a2—the fibrous structure is plunged into said solution of the catalyst so that the latter is adsorbed by said structure,
- a3—said structure is dried so as to evaporate said solvent, b) said structure is covered with said direct or indirect precursor, c) said structure covered with said precursor is subjected to a heat treatment by heating it between 60° C. and 400° C., depending on the cases, for a time between 4 and 40 hours so that:
- c1—the indirect precursor is transformed into a direct precursor, in the case where an indirect precursor is used,
- c2—the direct precursor penetrates into said fibrous structure,
- c3—the direct precursor polymerizes within the fibrous structure, d).
- d1—said fibrous structure impregnated with polymerized precursor is cooled, then
- d2—this fibrous structure is subjected to heat treatment for pyrolysing the polymerized precursor and transforming it into the desired ceramic material.

In order to obtain progressive and optimum densification of the starting fibrous structure, the cycle of operations a, b, c and d is repeated several times until the desired density is obtained for the composite ceramic material, formed of said fibrous structure and said matrix.

MORE DETAILED DESCRIPTION OF THE INVENTION

The following examples, associated with the accompanying figures, will better show how the invention may be put into practice.

EXAMPLE 1

1. A structure is formed of fibers in the form of a disk having a thickness of 1 cm and a diameter of 4 cm. The fibers are made from silicon carbide and have a length between 100 and 5000 microns. The fibers are distributed randomly in the volume of the disk and the proportion per unit of volume of the fibers is 25% (porosity per unit of volume=75%). The specific weight of the structure is then equal to $0.8g/cm^3$.

2. A polyborodiphenylsiloxane solution is formed at 40g per liter in a solvent. The polyborodiphenylsiloxane is for example prepared from diphenyldichlorosilane and boric acid.

This polyborodiphenylsiloxane solution forms the polymerization catalyst.

3. Polydimethylsilane is prepared.
For this, the following procedure may be used.

In a 20l reactor, 7.5l of xylene then 1250g of sodium are introduced. The medium is heated to 105° C. Then 3200g of dimethyldichlorosilane are added. Once the addition is finished, the temperature is stabilized at 120° C. for 10 hours.

After cooling, the excess of sodium is destroyed by introducing 9l of methanol. Hydrolysis is then completed in 40 liters of water. Then several successive washings are carried out with water, with acetone then with tetrahydrofurane.

After drying 1080g of polydimethylsilane are isolated, which is in the form of a white powder.

4. The fibrous structure is plunged for 30 minutes into the solution of the polymerization catalyst prepared under 2), so that said structure adsorbs said catalyst (operation a).

Then, the fibrous structure is taken out of said solution and dried so that the solvent evaporates.

5. The fibrous structure thus dried is introduced into a reactor (operation b), then is covered with polydimethylsilane prepared under 3) in an inert or reducing atmosphere.

6. This reactor is progressively heated to 400° C. so as to begin the thermolysis reaction. As soon as this temperature is reached, the reaction medium is cooled to about 300° C. This temperature is then maintained for at least 20 hours. During this operation the polydimethylsilane is transformed into liquid carbosilanes, which polymerize (operation c).

7. After cooling, the fibrous structure impregnated with polycarbosilanes is extracted from the reactor, then is subjected to pyrolysis so that the polycarbosilanes are transformed into silicon carbide (operation d).

8. After cooling, the specific weight of the structure is measured which is then equal to $1g/cm^3$.

9. The processing cycle described under points 4 to 8 is repeated six times, each time with the densified fibrous structure obtained in the preceding cycle. In the accompanying FIG. 1, the progressive evolution of the specific weight d has been shown as a function of the number N of processing cycles. At the end of the last processing operation (the seventh), the specific weight of the composite material of the present invention may be equal to $1.9g/cm^3$.

10. Test pieces are formed from the composite material disk and their mechanical properties evaluated by measuring the breaking stress under 3 flexion points. This measurement gives a breaking stress equal to 90 MPa.

EXAMPLE 2

A three dimensional structure of fibers is formed in the form of a parallelepiped (5.8×4.2×3.2 cm). The long fibers are made from silicon carbide. The proportion per unit of volume of fibers is about 45% (porosity per unit of volume equal to 55%). The specific weight of the structure is then equal to $0.8g/cm^3$.

Then steps 2 to 4 of example 1 are repeated. In addition:

11. In an inert atmosphere, thermolysis of 1200g of polydimethylsilane is carried out at 350° C., then the silanes thus formed are transferred under vacuum into a stripper. Thus, carbosilanes in the liquid state are isolated with a yield of 90%. Then:

12. The dried fibrous structure, resulting from operation 4, is covered with said liquid carbosilanes then heated in an inert and/or reducing atmosphere at 300° C. for at least 20 hours.

The result is the polymerization of the liquid carbosilanes (operation c). Then, steps 7 and 8 of example 1 are carried out, a specific weight equal to 1.1g/cm$^3$ is found.

Figure 2:
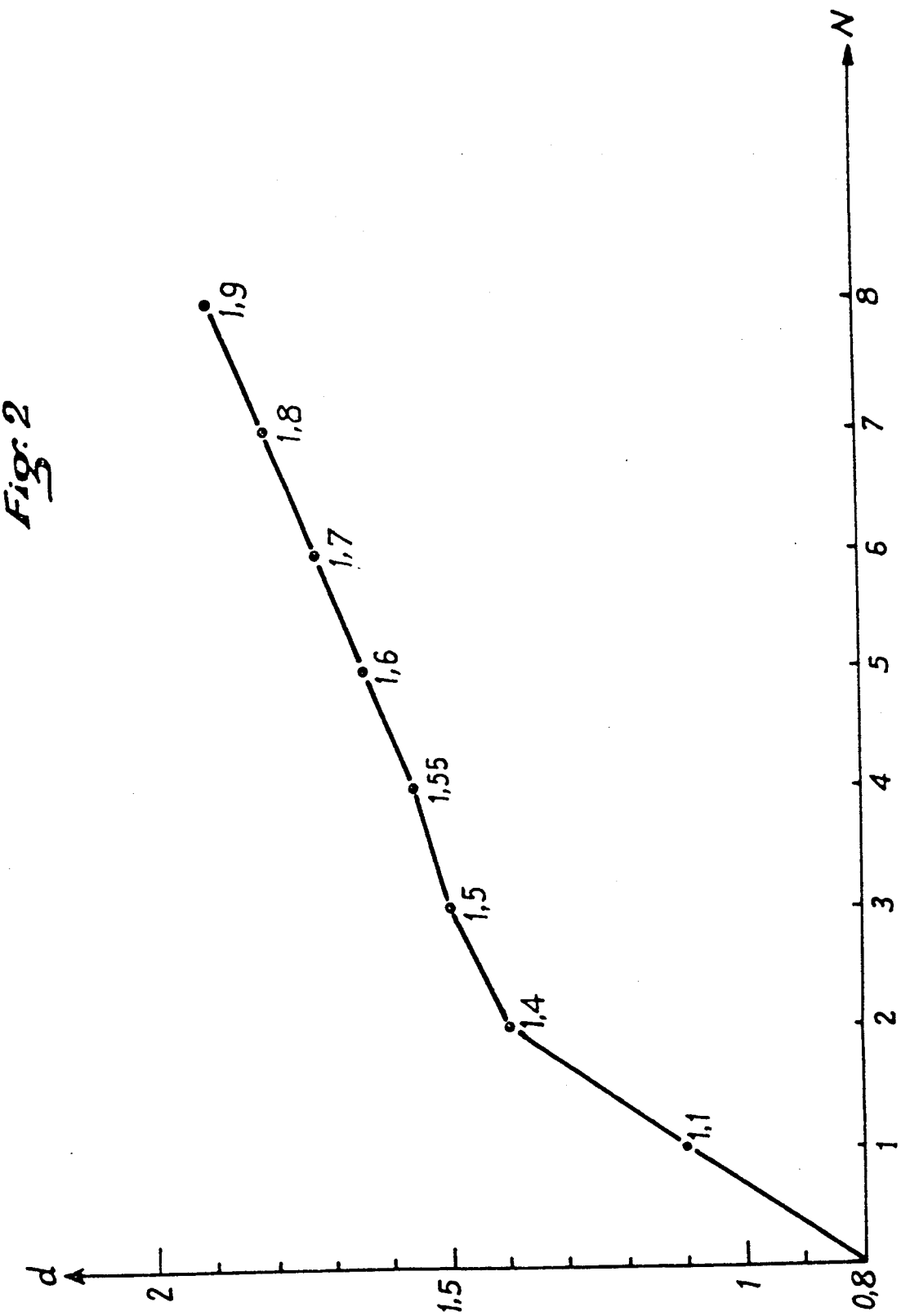

13. Points 4, 11, 12, 7 and 8 of the processing cycle are repeated seven times, each time with the densified fibrous structure obtained in the preceding cycle. In the accompanying FIG. 2, the progressive evolution of the specific weight d has been shown as a function of the number N of processing cycles. At the end of the last processing operation (the eighth), the specific weight of the composite material of the present invention can be seen to be equal to 1.9g/cm$^3$.

The operation of point 10 is carried out and a breaking stress equal to 125 MPa is found.

EXAMPLE 3

1. A structure of short alumina fibers is formed, distributed randomly as described in point 1 of example 1, the specific weight being 1.2g/cm$^3$.
2. A trifluoroacetic acid silicon is formed at a maximum of 10g per liter in a polar solvent. The trifluoroacetic acid used is a commercial product. This trifluoroacetic acid solution forms the polymerization catalyst.
3. B-triphenyl N-trimethylborazine is prepared by condensing an etherated phenylmagnesium bromide solution on N-trimethylborazine, the yield after extraction and purification being about 50%.
4. The fibrous structure is impregnated with the catalyst, in accordance with point 4 of example 1.
5. The dried fibrous structure is introduced into a reactor (operation b), then is covered with the B-triphenyl N-trimethylborazine prepared at 3) in an inert or reducing atmosphere.
6. This reactor is progressively heated above the melting point of this indirect precursor, i.e. about 350° for beginning the polymerization reaction. This temperature is then maintained for at least 24 hours.
7. After cooling, the polyborazine impregnated fibrous structure is extracted from the reactor then subjected to pyrolysis in an ammonia atmosphere, for obtaining the desired ceramic material of boron nitride type.
8. After cooling the specific weight of the structure is measured which is then equal to 1.3g/cm$^3$.
9. The processing cycle described under points 4 to 8 is repeated nine times, each time with the densified fibrous structure obtained in the preceding cycle, the ceramic material yield of this precursor being lower than that of the above described precursors.

Figure 3:
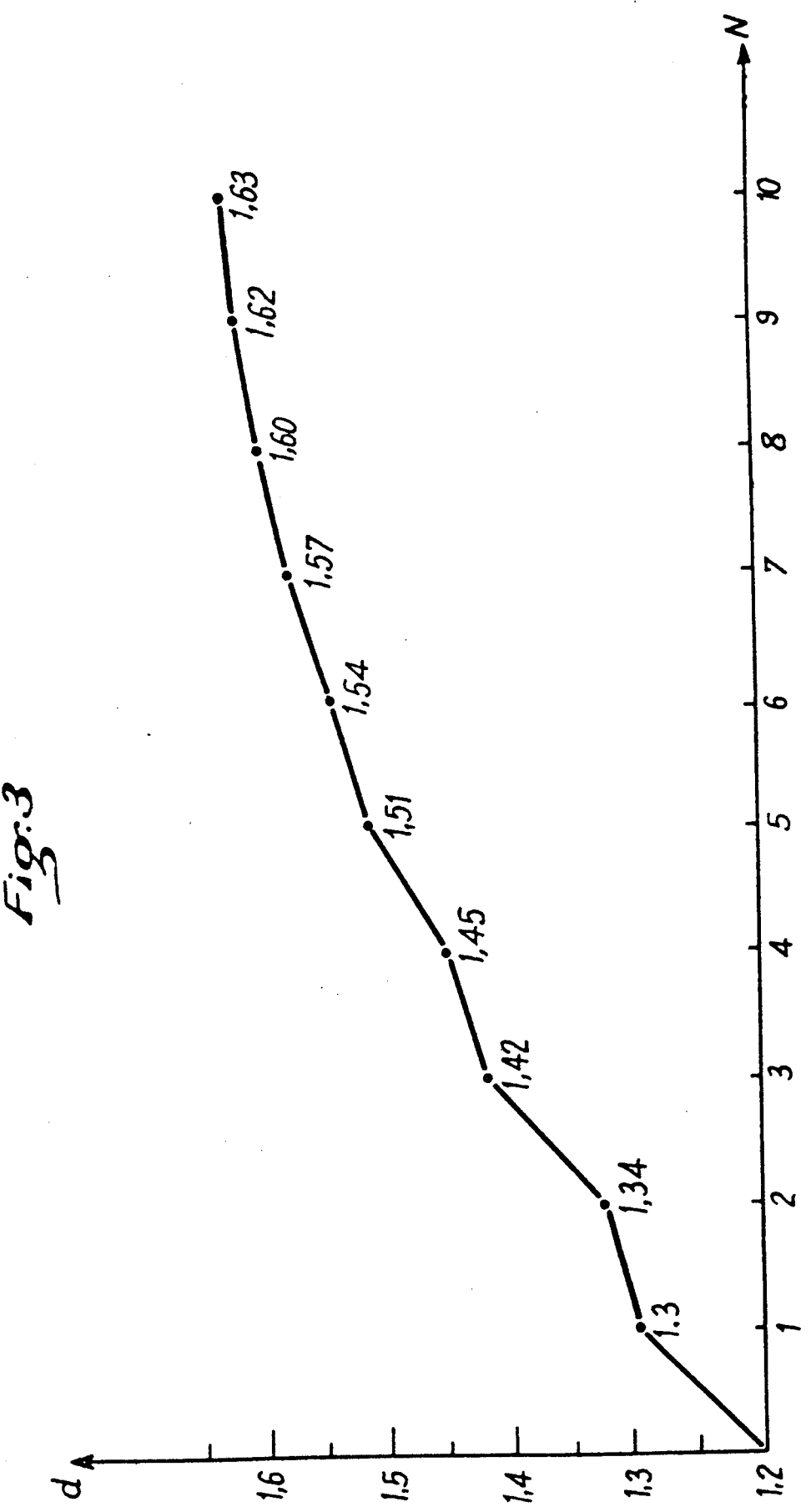

In the accompanying FIG. 3, the progressive evolution of the specific weight d has been shown as a function of the number N of processing cycles. At the end of the last processing operation (the tenth), the specific weight of the composite alumina/boron nitride material of the present invention may be equal to 1.63g/cm$^3$.

The operation of point 10 in example 1 is carried out and a mean breaking stress is found equal to 80 MPa.

EXAMPLE 4

Figure 4:
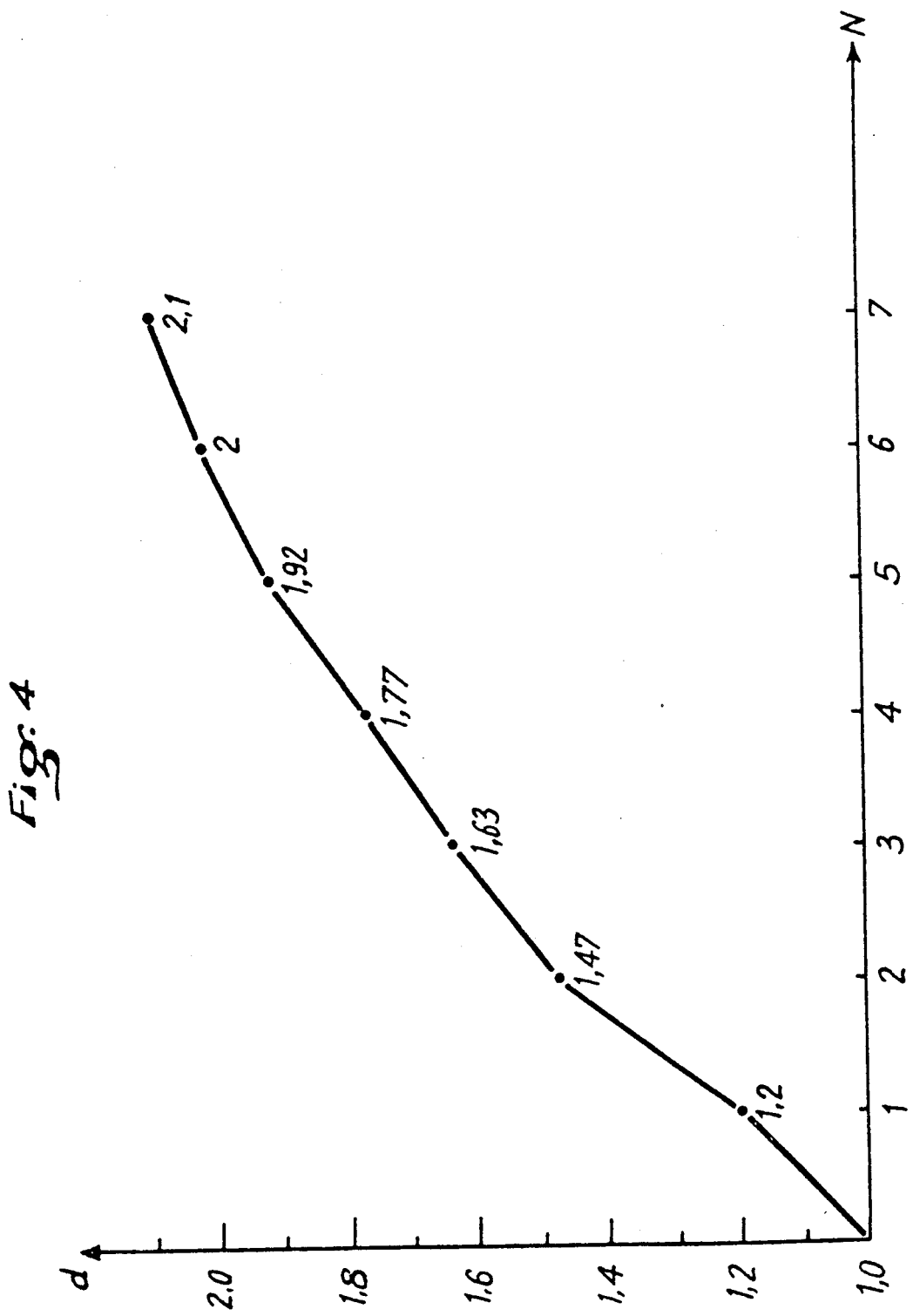

1. A structure of short aluminoborosilicate fibers is formed distributed randomly as described in point 1 of example 1, the specific weight being 1g/cm$^3$.
2. A solution of dodecacarbonyltriruthenium (commercial product) is formed at a maximum of 10g/l in a polar solvent. This solution forms the polymerization catalyst.
3. The fibrous structure is impregnated with the catalyst in accordance with point 4 of example 1.
4. The dried fibrous structure is introduced into a reactor, then is covered with tetramethyl-1,1,3,3 disilazane (commercial product).
5. An ammonia stream is introduced into the reactor, then is heated to 70° C. for at least 12 hours for generating the polysilazanes.
6. After cooling, the polysilazane impregnated fibrous structure is extracted from the reactor than is subjected to pyrolysis in an ammonia atmosphere up to 800° C., then in a nitrogen atmosphere, so as to obtain the desired ceramic material of silicon nitride type.
7. After cooling, the specific weight of the structure is measured which is then equal to 1.2g/cm$^3$.
8. The processing cycle described under points 4 to 8 is repeated six times, each time with the densified fibrous structure obtained in the preceding cycle. In the accompanying FIG. 4, the progressive evolution of the specific weight d has been shown as a function of the number N of processing cycles.

At the end of the last processing operation (the seventh), the specific weight of the composite alumina/silicon nitride material of the present invention can be seen to be equal to 2.1g/cm$^3$.

The operation of point 10 of example 1 is carried out and a mean breaking stress is found equal to 120 MPa.

What is claimed is:

1. A method for forming a composite ceramic material, in which a fibrous support is first of all formed which is then embedded in a material of a ceramic matrix, which method includes, in order to introduce said matrix into said structure, the following succession of operation:
   (a) said fibrous support is impregnated with a polymerization catalyst for polymerizing a polymerizable organometallic precursor capable of forming a ceramic matrix upon pyrolysis;
   (b) said fibrous support impregnated with said polymerization catalyst is placed in contact with said polymerizable organometallic precursor;
   (c) said organometallic precursor is polymerized, and
   (d) said organometallic precursor is pyrolyzed so as to obtain said matrix.

2. The method as claimed in claim 2, wherein said fibrous support is impregnated with a solution of said polymerization catalyst.

3. The method as claimed in claim 2, wherein said polymerization catalyst is selected from the group consisting of polyborodimethylsiloxane, polyborodiethylsiloxane, polyborodiphenylsiloxane, polyborodivinylsiloxane, trifluoromethanesulfonic acid and dodecacarbonyltriruthenium.

4. The method as claimed in claim 1, wherein the organometallic precursor is selected from the group consisting of carbosilanes, silazanes, carbolsilazanes, borazines, borazanes and aluminosilicate-silanes.

5. The method as claimed in claim 1, wherein the organometallic precursor used is a direct precursor of the desired material for the matrix.

6. The method as claimed in claim 5, for obtaining a silicon carbide matrix, wherein said direct precursor is carbosilane.

7. The method as claimed in claim 1, wherein the organometallic precursor used is an indirect precursor capable of giving rise, by heat treatment, to a direct precursor of the desired material for the matrix.

8. The method as claimed in claim 7, for obtaining a silicon carbide matrix, wherein said indirect precursor is polydimethylsilane.

9. The method as claimed in claim 7, for obtaining a boron nitride matrix, wherein said indirect precursor is B-triphenyl N-trimethylborazine.

10. The method as claimed in claim 7, for obtaining a silicon nitride matrix, wherein said indirect precursor is tetramethyl-1,1,3,3 disilazane.

11. The method as claimed in claim 7, wherein, in the above operation b) the fibrous support, impregnated with the catalyst, is placed in contact with the indirect precursor and the heat treatment for transforming the indirect precursor into a direct precursor, impregnation of the fibrous support with said direct precursor and polymerization of the latter are carried out substantially simultaneously.

12. The method as claimed in claim 1, wherein:
   (a)
     a1—a solution of the polymerization catalyst in a solvent is formed,
     a2—the fibrous support is plunged into said solution of the catalyst so that the catalyst is adsorbed by the support,
     a3—said support is dried so as to evaporate said solvent,
   (b) said support is covered with said direct precursor,
   (c) said support covered with said precursor is subjected to a heat treatment by heating between about 60° C. and 400° C. for a time between about 4 and 40 hours so that:
     c1—the direct precursor penetrates into said fibrous support,
     c2—the direct precursor polymerizes within the fibrous support,
   (d)
     d1—said fibrous support impregnated with polymerized precursor is cooled, then
     d2—said fibrous support is subjected to heat treatment for pyrolyzing the polymerized precursor and transforming it into the desired ceramic material of the ceramic matrix.

13. The method as claimed in claim 1, wherein the cycle of operations a, b, c, and d are repeated several times until the desired density is obtained for the composite ceramic material, formed of said fibrous structure and said matrix.

14. A method for forming a composite ceramic material having a fibrous structure embedded in a ceramic matrix, comprising the steps of:
   (a) impregnating said fibrous structure with a polymerization catalyst for polymerizing a polymerizable organometallic precursor of said ceramic matrix, said polymerizable catalyst selected from the group consisting of polyborodimethylsiloxane, polyborodiethylsiloxane, polyborodiphenylsiloxane, poyborodivinylsiloxane, trifluoromethanesulfonic acid, tribromomethanesulfonic acid, trifluoroacetic acid and dodecacarbonyltriruthenium;
   (b) placing said fibrous structure impregnated with said polymerization catalyst in contact with said polymerizable organometallic precursor selected from the group consisting of carbosilanes, silazanes, carbosilazanes, borazines, borazanes and aluminosilicate-silanes;
   (c) polymerizing said organometallic precursor; and
   (d) pyrolyzing said organometallic precursor so as to obtain said matrix.

15. A method for forming a composite ceramic material having a fibrous structure embedded in a ceramic matrix, comprising the steps of:
   (a) impregnating said fibrous structure with a polymerization catalyst for polymerizing a polymerizable organometallic precursor capable of forming ceramic matrix upon pyrolysis; and
   (b) placing said fibrous structure impregnated with said polymerization catalyst in contact with said polymerizable organometallic precursor, wherein the organometallic precursor used is an indirect precursor capable of giving rise, by heat treatment, to a direct precursor, and wherein the indirect precursor is B-triphenyl N-trimethylborazine;
   (c) polymerizing said organometalic precursor; and
   (d) pyrolyzing said organometallic precursor so as to obtain a boron nitride matrix.

16. The method as claimed in claim 7, wherein:
   (a)
     a1—a solution of the polymerization catalyst in a solvent is formed,
     a2—the fibrous support is plunged into said solution of the catalyst so that the catalyst is adsorbed by the support,
     a3—said support is dried so as to evaporate said solvent,
   (b) said support is covered with said indirect precursor,
   (c) said support covered with said precursor is subjected to a heat treatment by heating between about 60° C. and 400° C. for a time between about 4 and 40 hours so that:
     c1—the indirect precursor is transformed into a direct precursor,
     c2—the direct precursor penetrates into said fibrous support,
     c3—the direct precursor polymerizes within the fibrous support,
   (d)
     d1—said fibrous structure impregnated with polymerized precursor is cooled, then
     d2—said fibrous structure is subjected to heat treatment for pyrolyzing the polymerized precursor and transforming it into the desired ceramic material of the ceramic matrix.

* * * * *